Sept. 2, 1930.  F. FUCHS ET AL  1,774,642
DRAUGHT EXCLUDER
Filed April 18, 1929
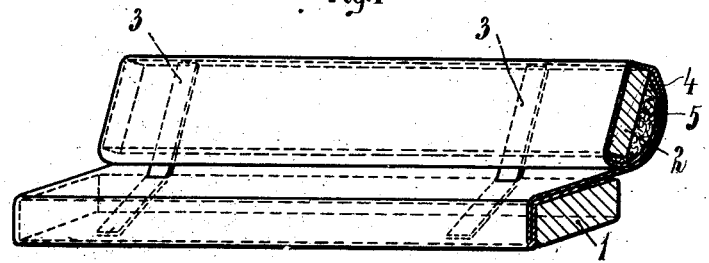
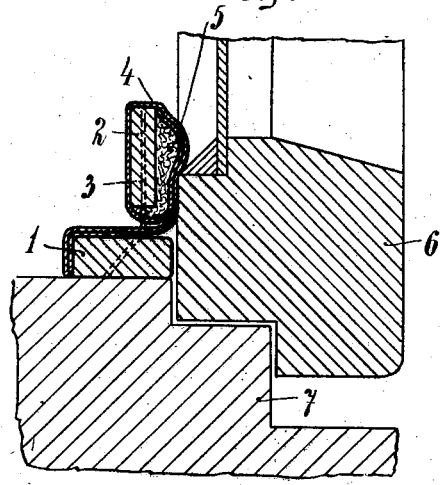
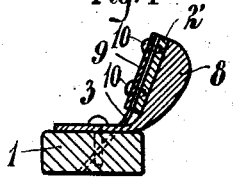
Inventors:
František Fuchs
Antonín Štěpán Patented Sept. 2, 1930

1,774,642

UNITED STATES PATENT OFFICE

FRANTIŠEK FUCHS AND ANTONÍN ŠTĚPÁN, OF PRAGUE, CZECHOSLOVAKIA

DRAFT EXCLUDER

Application filed April 18, 1929, Serial No. 356,237, and in Czechoslovakia April 24, 1928.

This invention relates to a draft-excluder for windows, doors and the like, and consists in the provision of a supporting strip which is rigidly secured to the window or door frame and which forms an air tight joint with a padded tightening strip which it supports resiliently in position to be engaged by the closed door or window.

Fig. 1 of the accompanying drawings represents a perspective view of the device, Fig. 2 is a cross-section of the same, Fig. 3 is a cross-section showing the device in use, and Fig. 4 is a cross-section of the device of modified construction.

The draft-excluder comprises a supporting strip 1 of wood or metal which is secured in any suitable manner to the window or door frame 7 and which supports, resiliently, a padded tightening strip 2 arranged so as to be engaged by the closed door or window 6 and form an air-tight fit with the same. The resilient connection between the two strips is effected by means of spaced blade springs 3 which are connected to the strip 2 and simply inserted in slits made for their reception in the strip 1. The springs may have fastening apertures for the reception of nails or screws as shown in Figs. 2 and 4.

The padding 5 of the strip 2 may be composed of cotton wool or any other suitable material enclosed in a cover 4 of fabric or the like, said cover being extended and connected also to the strip 1 so as to form an air-tight joint between the two strips. The tightening strip occupies normally a forwardly-inclined position so that it has to be pressed back by the window 6, as shown in Fig. 3, thereby effecting a deformation of the padding and ensuring an air-tight joint.

In the construction shown in Fig. 4, the tightening strip 2' is fitted with a padding 8 which is composed of solid, soft rubber and formed with a thinned-out extension whereby it is connected to the supporting strip 1. The padding is cemented to the strip 2', and the springs 3 are connected to the strip by means of screws 10 and a clamping plate 9.

The latter construction is particularly suitable for doors and windows exposed to damp.

We claim:

1. A draft-excluder for windows and the like comprising a supporting strip connected rigidly to the window frame, a padded tightening strip forming an air-tight joint with said supporting strip, and spaced blade springs connected to the tightening strip and inserted into slits in said supporting strip, said springs being adapted to press the tightening strip against the closed window.

2. A draft-excluder for windows and the like comprising a supporting strip connected rigidly to the window frame, a padded tightening strip, flexible covering material connecting said tightening strip to the supporting strip so as to form an air-tight joint therewith, and spaced blade springs connected to the tightening strip and inserted into the supporting strip, said springs being adapted to press the tightening strip against the closed window.

FRANTIŠEK FUCHS.
ANTONÍN ŠTĚPÁN.